United States Patent
Giri et al.

(10) Patent No.: US 11,762,756 B2
(45) Date of Patent: Sep. 19, 2023

(54) SYSTEM AND METHOD FOR STARTUP DATA VERIFICATION

(71) Applicant: Dell Products L.P., Round Rock, TX (US)

(72) Inventors: Prashanth Giri, Round Rock, TX (US); Michael Emery Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 17/496,066

(22) Filed: Oct. 7, 2021

(65) Prior Publication Data
US 2023/0112396 A1    Apr. 13, 2023

(51) Int. Cl.
*G06F 11/36*    (2006.01)
*G06F 21/64*    (2013.01)
*G06F 11/07*    (2006.01)

(52) U.S. Cl.
CPC ...... *G06F 11/3604* (2013.01); *G06F 11/0793* (2013.01); *G06F 21/64* (2013.01)

(58) Field of Classification Search
None
See application file for complete search history.

(56) References Cited

U.S. PATENT DOCUMENTS

| | | | |
|---|---|---|---|
| 10,789,062 B1* | 9/2020 | Suryanarayana | G06F 8/65 |
| 11,630,591 B1* | 4/2023 | Kadaba Chaluvaiah | |
| | | | G06F 9/4416 |
| | | | 711/154 |
| 2017/0235959 A1* | 8/2017 | Nelson | G06F 21/64 |
| | | | 726/23 |
| 2018/0322012 A1* | 11/2018 | Sharma | G06F 11/0793 |
| 2019/0340379 A1* | 11/2019 | Beecham | G06F 16/9014 |
| 2020/0089562 A1* | 3/2020 | Panesar | G01R 31/31717 |

\* cited by examiner

*Primary Examiner* — Marina Lee
(74) *Attorney, Agent, or Firm* — Womble Bond Dickinson (US) LLP

(57) ABSTRACT

Methods, systems, and devices for providing for trust during startup of an information handling system (IHS) are disclosed. When an IHS starts up, data may be read into memory and used by a processor of the IHS to begin execution of a startup management entity that places the IHS into a desired operating system. To reduce the likelihood of the data used for IHS startup causing the IHS to enter an undesired state (e.g., due to data corruption or intentional action), the data may be verified prior to be being read into memory. If the data is unverifiable, then corrective action may be taken.

18 Claims, 10 Drawing Sheets

SYSTEM AND METHOD FOR STARTUP DATA VERIFICATION

FIELD DISCLOSED HEREIN

Embodiments disclosed herein relate generally to device startup. More particularly, embodiments disclosed herein relate to systems and methods to manage data access for startup.

BACKGROUND

Computing devices may provide various services. For example, computing devices may host applications that store data, process data, and generate data thereby providing services. Depending on the type of processing performed, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
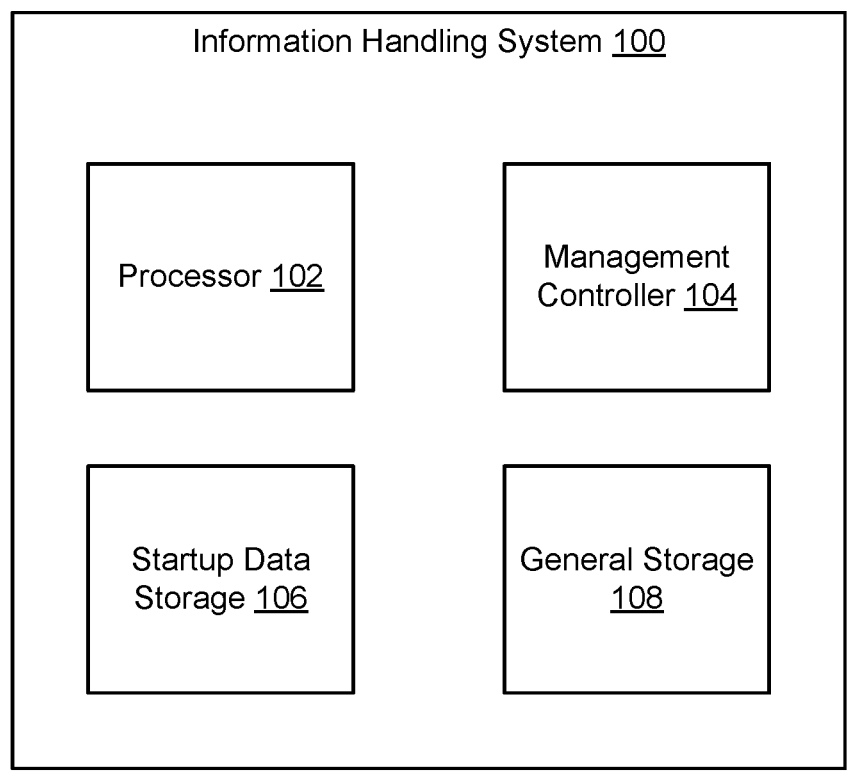
FIG. 1A shows a block diagram illustrating an information handling system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

In general, embodiments disclosed herein relate to methods, systems, and devices for providing for trust during startup of an information handling system (IHS). When an IHS starts up, data may be read into memory and used by a processor of the IHS to begin execution of a startup management entity that places the IHS into a desired operating system.

To reduce the likelihood of the data used for IHS startup causing the IHS to enter an undesired state (e.g., due to data corruption or intentional action), the data may be verified prior to be being read into memory. If the data is unverifiable, then corrective action may be taken.

In an embodiment, the data include cryptographic data usable to cryptographically verify the data. However, the operations for cryptographically verifying the data may be computationally and/or time costly. Cryptographically verifying the data during each startup may degrade a user experience of the IHS by causing the use to wait through the cryptographic verification process.

An IHS in accordance with an embodiment may perform a startup that does not regularly include cryptographic verification of the data used during startup. Rather, after the data used during startup is cryptographically verified, verification data and error correction data may be generated. During subsequent startups, the data used during startup may be verified using the verification data which may utilize substantially fewer computational resources for verification than cryptographic verification. Accordingly, the duration of time for verifying the data used during startup with the verification data may also be substantially less than the time for cryptographic verification of the data used during startup.

Like the verification data, the error correction data may also be used to reduce the computational expense and/or time for verifying the data used during startup. As the data is read, the data may be error corrected thereby removing errors that may otherwise cause the read data to fail verification. Accordingly, computationally expensive rescue or other type of data recovery operations may be avoided (which may be otherwise performed when data used during startup fails verification).

Consequently, an improved user experience for an IHS may be provided in an embodiment disclosed herein. Similarly, the IHS may better marshal limited computing resources by shifting computing resources that would otherwise be used for data verification to perform other functionalities. In this manner, an embodiment disclosed herein may maintain a trusted environment (e.g., by verifying data prior to using it) while limiting computing resources expended toward maintaining the trusted environment.

In an embodiment, a computer-implemented method for starting operation of an information handling system is provided. The method may include reading, by a management controller of the information handling system, data blocks from a startup data storage, the data blocks comprising an image of a startup management entity for the information handling system and at least one corruption; for a first portion of the data blocks that comprise the at least one corruption, correcting, by the management controller, each data block of the first portion using error correction data to obtain a portion of corrected data blocks without correcting a second portion of the data blocks that do not comprise the at least one corruption based on the error correction data; updating, by the management controller, the data blocks based on the portion of corrected data blocks to obtain updated data blocks stored in the startup data storage, the updated data blocks comprising the image of the startup management entity and not the at least one corruption; determining, by the management controller using the second portion of the data blocks, the portion of corrected data blocks, and verification data, whether the startup management entity is a trusted entity; when the startup management entity is determined as being the trusted entity, initiating, by the management controller, execution of the startup management entity by the information handling system with the updated data blocks in the startup data storage; and when the startup management entity is determined as not being the trusted entity, preventing, by the management controller, the execution of the startup management entity by the information handling system.

The method may also include reading, by the management controller, a previous version of the data blocks from the startup data storage, the previous version of the data blocks include the image of the startup management entity and not the at least one corruption; performing a cryptographic verification of the data blocks to determine whether the startup management entity is the trusted entity; when the startup management entity is the trusted entity, generating, based on the previous version of the data blocks, the verification data and the error correction data; and storing the verification data and the error correction data with the management controller.

The method may also include reading, by the management controller, other data blocks from the startup data storage; identifying, by the management controller, a first portion of the other data blocks using second verification data, the verification data being associated with the data blocks and the second verification data being associated with the other data blocks; generating, by the management controller, a restore point based on the first portion of the other data blocks; updating, by the management controller, the second verification data based on the first portion of the other data blocks; and storing the restore point with the management controller.

The other data blocks may be used with execution of the startup management entity.

The data blocks may include immutable data and the other data blocks may include mutable data.

The method may also include making a second determination, by the management controller, that an attempt to begin execution of the startup management entity failed; in response to the second determination, reverting the other data blocks in the startup data storage with the restore point to obtain reverted other data blocks in the startup data storage; and initiating, by the management controller, execution of the startup management entity by the information handling system with the updated data blocks and the reverted other data blocks in the startup data storage.

Reading the data blocks may include multiplexing data access to the startup data storage from a processor of the information handling system to the management controller, initiating execution of the startup management entity may include multiplexing the data access to the startup data storage from the management controller to the processor, and initiating reading, by the processor, of the startup data storage with the data access to the startup data storage.

Determining whether the startup management entity is the trusted entity may include performing a hash check of each data block of the second portion of the data blocks against corresponding portions of the verification data; and performing a hash check of each data block of the portion of corrected data blocks against corresponding portions of the verification data.

The determining whether the startup management entity is the trusted entity may be completed without performing a cryptographic verification of the data blocks with cryptographic data stored in the data blocks.

The management controller may include a computing device that is hosted by the information handling system and operates independently from the information handling system.

A non-transitory media may include instructions that when executed by a processor cause the computer-implemented method to be performed.

An information handling system may include the non-transitory media and a processor, and may perform the computer-implemented method when the computer instructions are executed by the process.

Turning to FIG. 1A, a block diagram illustrating an information handling system (IHS) in accordance with an embodiment is shown. The IHS shown in FIG. 1A may provide any type and quantity of computer implemented services.

The computer implemented services may include, for example, database services, instant messaging services, video conferencing services, etc. To provide these services, IHS 100 may host applications (not shown) that provide these (and/or other) computer implemented services. The applications (or other types of executing entities) may presume (and/or may require for proper operation of the applications) that IHS 100 operate in a predetermined manner. The predetermined manner of operation may include, for example, hosting an operating system, drivers, or other types of management entities that mediate, facilitate, or otherwise manage the operation of IHS 100 in a manner which enables the applications to operate (e.g., by providing abstracted access to hardware resources used in the execution of the applications). When operating, the applications may store and use data in general storage 108 of IHS 100.

To operate in the predetermined manner, IHS 100 may perform one or more operations to enter the predetermined manner of operation (by changing from other manners of operation to the predetermined manner of operation). These operations may include, for example, performing a boot process from a power-on (or reset or other manner of operation that differs from the predetermined manner of operation to the extent that the applications may not be able to operate) to handing off management of IHS 100 to an operating system or other type of operational management entity that places IHS 100 into the predetermined manner of operation. The operating system may, for example, provide abstracted access to resources utilized by the applications, manage data storage and data retrieval, etc.

For example, consider a scenario where IHS 100 has been shut off. After IHS 100 is turned on, IHS 100 may be operating in a startup manner during which the IHS may not be able to support execution of an application (e.g., the application may not be able to successfully execute until the client hosts an operating system). To enter the predetermined manner of operation conducive to execution of applications, IHS 100 may go through a boot process which may be performed by a type of management entity such as a basic input-output system and/or other type of startup management entity. The startup management entity may perform any number of actions (e.g., a "boot process") to prepare IHS 100 to begin execution of an operating system or other type of management entity.

To begin operation of the startup management entity, IHS 100 may use data stored in startup data storage 106. The data may include (i) computer code (e.g., computer instructions that when executed by processor 102 performs the functionality of the startup management entity), (ii) cryptographic data usable to verify the computer code is for a trusted startup management entity, and (iii) other data such as configuration settings for the startup management entity. Generally, the computer code may be substantially immutable whereas the other data may be mutable to allow, for example, the startup management entity to take different actions or operate in different manners over time.

To improve the likelihood that a desired startup management entity (e.g., a trusted entity) is instantiated when the computer code is executed by processor 102, the cryptographic data may be used to verify the computer code (e.g., to provide for a root of trust to be established). However, the process for verifying the code with the cryptographic data may be computationally expensive and/or time consuming. Similarly, the cryptographic data may not be usable to verify the other data by virtue of the other data changing over time.

Further, if the computer code is not verifiable (e.g., due to data corruption, malicious activity, etc.), then it may be presumed for root of trust purposes that the data in startup data storage 106 should be rescued by rewriting the entire contents of startup data storage 106 to attempt to remediate the unverifiable data. However, rewriting the entire contents of startup data storage 106 may be very time consuming by virtue of the storage media used to implement startup data storage 106.

In general, embodiments disclosed herein relate to methods, systems, and devices for starting up information handling systems in a time and/or computationally efficient manner. To provide for startup of IHSs in a time and/or computationally efficient manner, an IHS may, after cryptographically verifying data in startup data storage 106, generate verification data and error correction data. During subsequent startups of the IHS, the verification data and error correction data may be used to (i) verify whether data in startup data storage 106 likely includes computer code for a trusted startup management entity (or for other trust verification purposes), (ii) correct corruptions that may otherwise render the data in startup data storage 106 unverifiable (e.g., such as due to unintended bit flips), and (iii), allow restoration points to be created for mutable data in startup data storage 106, which may be usable to roll back changes to the mutable data (e.g., such as configuration settings modified over time that may cause the startup entity to operate in an undesired manner or not operate).

During these processes during the subsequent startups of the IHS, the cryptographic data in startup data storage 106 may not be used for verification purposes thereby reducing the time and/or computational cost for verifying whether a trusted startup management entity will be instantiated with the data in startup data storage 106. Likewise, the use of restore points for mutable data modification, in contrast to complete rewrites of startup data storage 106 through traditional rescue processes, may reduce the time required for restoring the data in startup data storage 106 to a more desirable state for use. Further, by correcting corruptions on the fly with the error correction data, the data in startup data storage 106 may be more likely to be verified thereby reducing time and/or computationally costly rescue operations for the data.

To provide its functionality, IHS 100 may include processor 102, management controller 104, startup data storage 106, and general storage 108. Each of these components is discussed below.

Processor 102 may be a hardware processor such as, for example, a central processing unit, a core of a processor, an embedded processor, a controller, and/or any other type of hardware processor. Processor 102 may execute computer code and provide corresponding functionalities when various computer code is executed. Upon startup of IHS 100, processor 102 may automatically start execution of computer code in startup data storage 106 and otherwise use the data in startup data storage 106 for startup purposes. However, prior to the automatic execution, management controller 104 may perform a verification of the computer code and/or other data stored in startup data storage 106. Depending on whether the data in startup data storage 106 is verified, processor 102 may be allowed to or prevent from automatically executing the computer code and/or otherwise utilizing the data in startup data storage 106 until the data is verified (e.g., through a repair mechanism, replacement mechanism, rescue mechanism, etc.).

Once processor 102 begins to execute the computer code in startup data storage 106, processor 102 may perform the functionality of a startup management entity thereby eventually placing IHS 100 in the predetermined operating state conducive to application execution. When in the predetermined operating state, applications may begin executing with processor 102 to provide any number and quantity of computer implemented services.

Management controller 104 may provide data verification and/or remediation services for data in startup data storage 106 (e.g., thereby providing the root of trust for IHS 100). The data verification services may include (i) cryptographically verifying all or a portion of the data in startup data storage 106, (ii) generating verification data and error correction data using the cryptographically verified data in startup data storage 106, (iii) correcting errors in the data in startup data storage 106 using the error correction data, (iv) verifying the data (e.g., corrected and uncorrected) in startup data storage 106 with the verification data, and/or (v) generating restore points for mutable data in startup data storage 106. When providing the data verification service, (ii) may generally only be performed once thereby greatly reducing the computational and/or time cost for data verification using cryptographic data in startup data storage 106. Likewise, performing (iii) may reduce the likelihood of failed verifications occurring by correcting some corruptions of data in startup data storage 106 on the fly as the data is also verified in (iv).

The remediation services may include (i) using restore points to roll back changes to mutable data in startup data storage 106 and (ii) initiating rewrites of startup data storage 106 when rollbacks and/or the correcting of errors in the data in startup data storage 106 is insufficient to place the data in startup data storage 106 in a verifiable condition. By doing so, the data in startup data storage 106 may be modified to be in a verifiable condition.

When providing its functionality, management controller 104 may perform all, or a portion, of the methods illustrated in FIGS. 3-5B.

Management controller 104 may be implemented with a computing device. The computing device may be hosted by, may be operably connected to, and may operate independently from IHS 100. For example, management controller 104 may be implemented using an out of band management controller. For additional details regarding computing devices, refer to FIG. 6. For additional details regarding management controller 104, refer to FIG. 1B.

Startup data storage 106 may be implemented with one or more physical storage devices. The physical storage devices may include, for example, a non-volatile storage device such as a flash memory chip. For additional details regarding data stored in startup data storage 106, refer to FIG. 2A.

In an embodiment, startup data storage 106 is operably connected to processor 102 and management controller 104 with a multiplex able serial peripheral interface (SPI) bus. Generally, the SPI bus may only support a point to point operable connection thereby only allowing for startup data storage 106 to be operably connected to processor 102 and/or management controller 104 at any point in time. A multiplexer may be positioned between startup data storage 106 and both processor 102 and management controller 104 to allow for the operable connection to be switched over time thereby allowing processor 102 and management controller 104 to read and/or write data to startup data storage 106 at different points in time. During startup, the operably connection may be set between management controller 104 and startup data storage 106 until the data in startup data storage 106 is verified. Once verified, the operable connection may be set between startup data storage 106 and processor 102 to allow processor 102 to read data from startup data storage 106 to instantiate the startup management entity.

General storage 108 may be implemented with any number and quantity of storage devices such as, for example, hard disk drives, solid state drives, device controllers, memory devices, and/or other types of device usable to provide for the persistent storage of data. In contrast to startup data storage 106 which may generally be restricted for the storage of certain types of data usable for startup purposes, general storage 108 may provide for the general storage of data. For example, when applications hosted by IHS 100 use data, the data may be stored in general storage 108.

In an embodiment, general storage 108 is operably connected to processor 102 and/or management controller 104 via a different bus from that which connects startup data storage 106 to other devices. For example, general storage 108 may be operably connected to other devices such as processor 102 via a serial ATA interface, a peripheral component interconnect interface, a fabric (e.g., Non-Volatile Memory Express Over Fabric (NVMe-of) interface), and/or any type and/or combination of communications interfaces and corresponding network topologies. While illustrated in FIG. 1A as being part of IHS 100, in an embodiment, general storage 108 is remote to IHS 100 and connected to processor 102 via a network (not shown) which may be part of an NVMe-oF or other type of communication topology that supports remote data access for storage devices.

While some specific components of IHS 100 have been highlighted and discussed above, IHS 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6. In addition to those components highlighted, IHS 100 may include any of the components discussed with respect to FIG. 6.

Additionally, while illustrated in FIG. 1A as including a limited number of specific components, an information handing system in accordance with an embodiment may include fewer, additional, and/or different components than those illustrated therein.

Figure 1B:
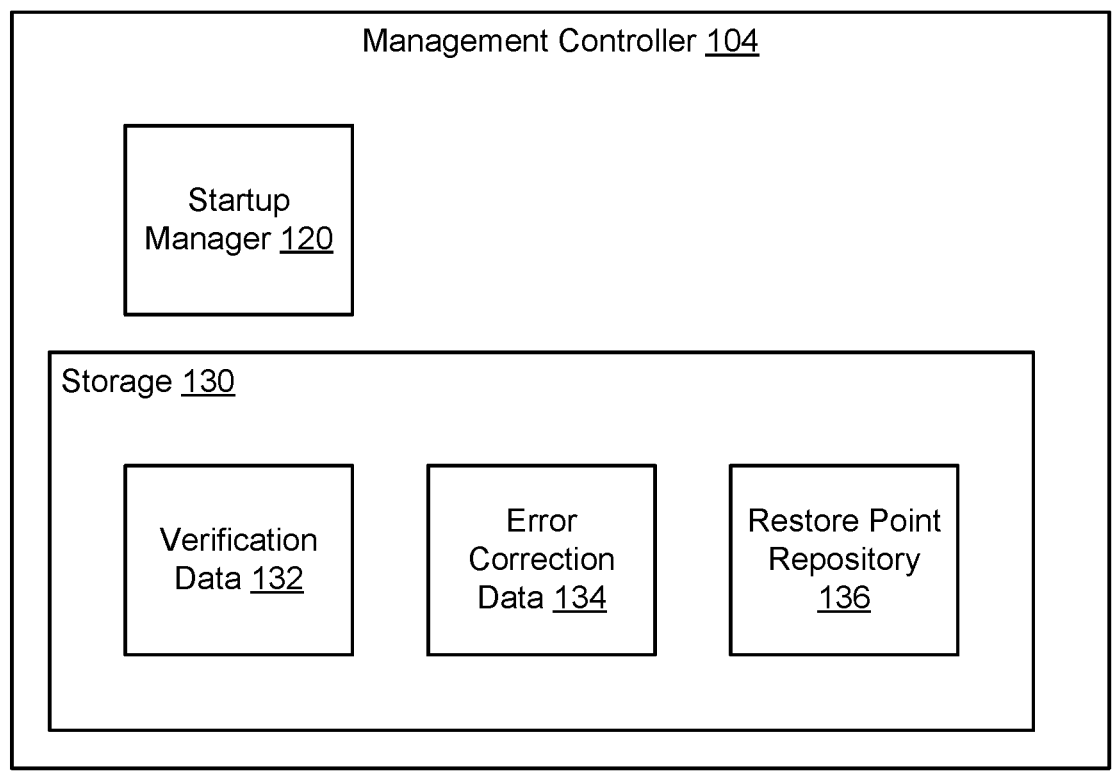
FIG. 1B shows a block diagram illustrating a management controller in accordance with an embodiment.

Turning to FIG. 1B, a diagram of an example of management controller 104 in accordance with an embodiment is shown. As discussed above, management controller 104 may manage the process of starting up IHS 100, in addition to performing any number and type of other functionalities. To provide the aforementioned functionality, management controller 104 may include startup manager 120 and storage 130. Each of these components is discussed below.

Startup manager 120 may manage the operation of management controller 104 and facilitate management of startup of IHS 100. To facilitate management of startup of IHS 100, startup manager 120 may include functionality to (i) read and write data to startup data storage 106 (when appropriately multiplexed to management controller 104), (ii) cryptographically verify data in startup data storage 106 with cryptographic data in the data, (iii) generate verification data 132, (iv) generate error correction data 134), and generate restore points for restore point repository 136. When providing its functionality, startup manager 120 may perform all, or a portion, of the methods illustrated in FIGS. 3-5B.

In an embodiment, startup manager 120 is implemented using a hardware device including circuitry. The hardware device may be, for example, a digital signal processor, a field programmable gate array, or an application specific integrated circuit. The circuitry may be adapted to cause the hardware device to perform the functionality of startup manager 120. Startup manager 120 may be implemented using other types of hardware devices without departing embodiment disclosed herein.

In one embodiment, startup manager 120 is implemented using a processor adapted to execute computing code stored on a persistent storage that when executed by the processor performs the functionality of startup manager 120 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 130 is implemented using physical devices that provide data storage services (e.g., storing data and providing copies of previously stored data). The devices that provide data storage services may include hardware devices and/or logical devices. For example, storage 130 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 130 may include a memory device (e.g., a dual in line memory device) in which data is stored and from which copies of previously stored data are provided. In another example, storage 130 may include a persistent storage device (e.g., a solid-state disk drive) in which data is stored and from which copies of previously stored data is provided. In a still further example, storage 130 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 130 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 130 may store data structures including verification data 132, error correction data 134, and restore point repository 136. Each of these data structures is discussed below.

Verification data 132 may include one or more data structures that include information usable to verify data blocks (e.g., data stored in startup data storage). The data structures may include, for example, a hash tree with nodes corresponding to data blocks stored in startup data storage. The nodes may include information (e.g., hashes) usable to verify (e.g., matching data derived from the data blocks to the information included in the respective node) the corresponding data blocks (e.g., by calculating one or more hashes with the data blocks).

In an embodiment, verification data 132 includes first verification data for immutable data stored in data blocks of startup data storage and second verification data for mutable data stored in other data blocks of startup data storage. Because the mutable data may change over time, a verification failure of the other data blocks with the second verification data may indicate a change to the data in the other data blocks. When such changes are detected, a restore point may be generated and stored in restore point repository 136. The restore point may be usable to revert changes to the other data blocks that caused the verification failure. Any number of restore points may be generated usable to revert any number of changes to the mutable data stored in startup data storage over time. When a restore point is generated or a restore point is used to perform a reversion (or otherwise modify the other data blocks), second verification data may be regenerated based on the changed other data blocks so that future changes to the other data blocks may be detectable with the second verification data. Second verification may be implemented with, for example, a separate data structure (e.g., another hash tree) or a same data structure that includes first verification data (e.g., a hash tree with different nodes corresponding to the immutable and mutable data in data blocks and other data blocks, respectively).

In contrast to second verification data, first verification data may only be generated once (e.g., after immutable data in data blocks of startup data storage). For example, the first verification data may be generated for the data blocks that store immutable data (e.g., computer code for a trusted startup manager). Subsequent verification failures for the first verification data may be treated as verification failures rather than as indications of changes to data in startup data storage.

Error correction data 134 may include one or more data structures that include information usable to correct corruptions of data blocks. For example, error correction data 134 may parity bits or other types of data for corresponding data blocks usable to detect and/or correct bit flips or other types of corruptions of data blocks. Error correction data 134 may be generated for the data blocks stored in startup data storage after the data blocks are cryptographically verified. Like the second verification data, portions of error correction data 134 corresponding to data blocks of startup data storage that store mutable data may be updated when a restore point is generated.

Restore point repository 136 may include one or more data structures that include information usable to revert changes (or re-implement changes) to mutable data stored in data blocks of startup data storage. Refer to FIG. 2C for additional details regarding restore point repository 136.

The data structures stored in storage 130 may be implemented using, for example, lists, tables, unstructured data, trees, databases, etc. While illustrated in FIG. 2A as being stored locally, any of the data structures may be stored remotely and may be distributed across any number of devices without departing from embodiments disclosed herein. Additionally, any of the data structure may include different, less, and/or additional information without departing from embodiments disclosed herein.

While illustrated in FIG. 1B as including a limited number of specific components, a management controller in accordance with an embodiment may include fewer, additional, and/or different components than shown herein.

Figure 2A:
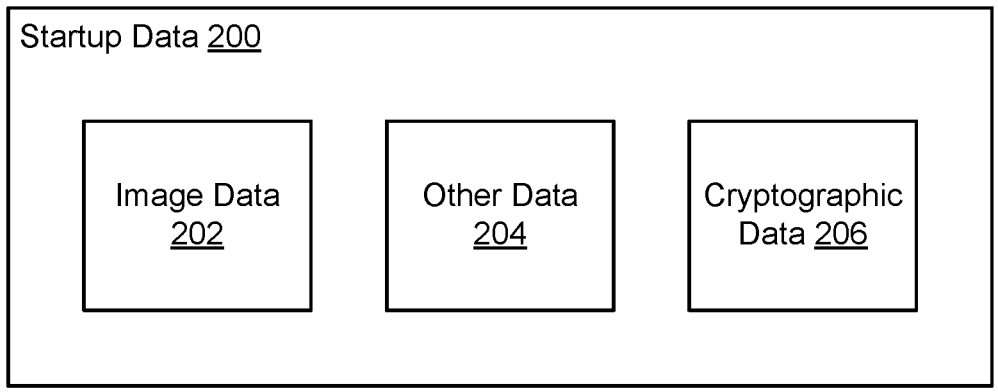
FIG. 2A shows a block diagram illustrating startup data in accordance with an embodiment.

Turning to FIG. 2A, a diagram of startup data 200 in accordance with an embodiment is shown. Startup data 200 may be stored in startup data storage 106 and may be usable to startup IHS 100. Startup data 200 may include image data 202, other data 204, and cryptographic data 206.

Image data 202 may include information usable to being execution of a startup management entity. For example, image data 202 may include computer code executable by a processor (e.g., when loaded into memory). Generally, image data 202 may be immutable.

Other data 204 may include other types of data such as, for example, configuration settings, identifiers, and/or other information. In contrast to image data 202, other data 204 may be mutable such that its contents change over time.

Cryptographic data 206 may include information usable to cryptographically verify image data 202 and/or other data 204. For example, cryptographic data 206 may include signatures, check sums, and/or other data usable to perform a cryptographic verification process that indicates whether the image data 202 and/or other data 204 should be trusted.

Generally, image data 202, other data 204, and cryptographic data 206 may be stored in data blocks in startup storage. Generally, the immutable data may be stored in first data blocks and the mutable data may be stored in second data blocks.

Figure 2B:
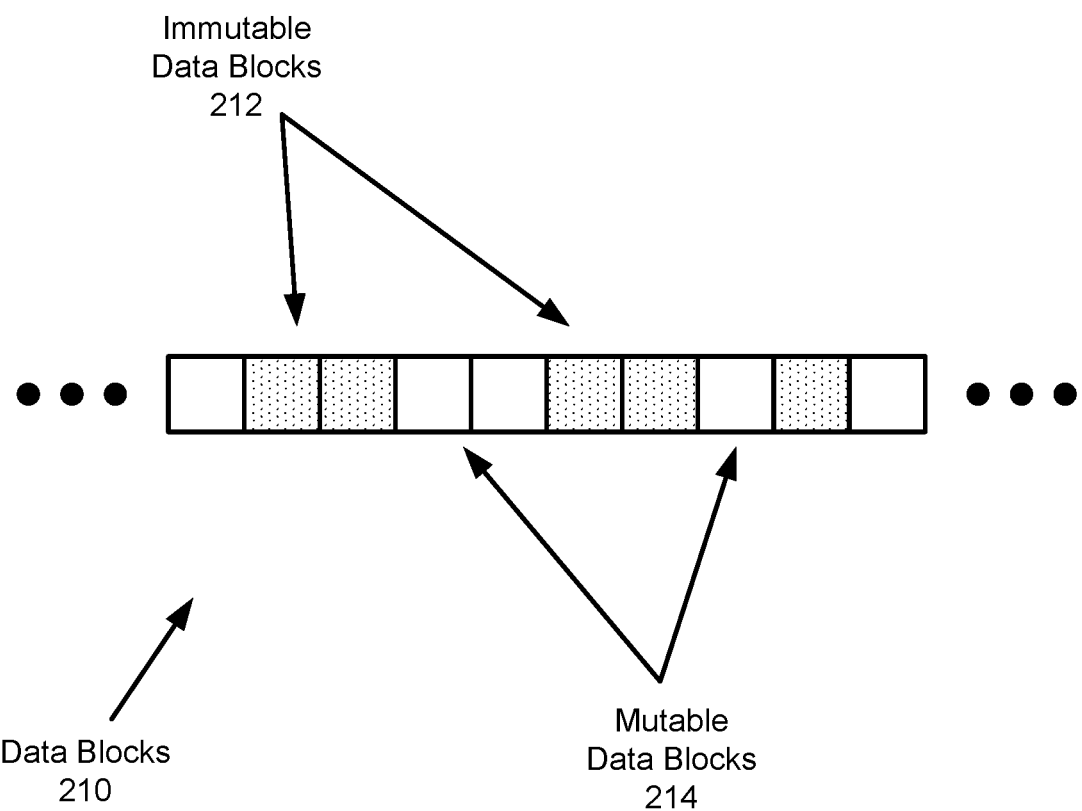
FIG. 2B shows a block diagram illustrating data blocks in accordance with an embodiment.
Figure 2C:
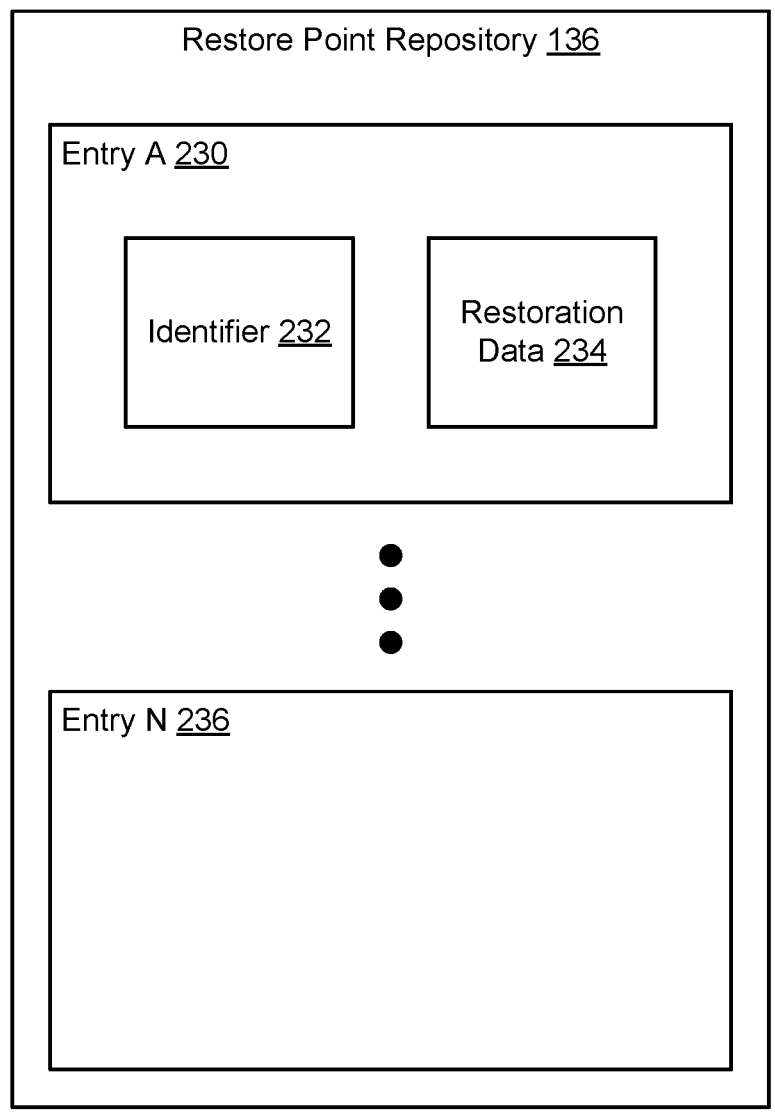
FIG. 2C shows a block diagram illustrating a restore point repository in accordance with an embodiment.

For example, turning to FIG. 2B, a diagram of an arrangement of data blocks 210 in accordance with an embodiment is shown. As seen, data blocks 210 (which may correspond to a physical addressing scheme of storage resources of the startup data storage such that various blocks may be efficiently read) may include immutable data blocks 212 in which immutable data is stored and mutable data blocks 214 (illustrated in FIG. 2B as rectangles with a dotted fill pattern) in which mutable data is stored. Data blocks 210 may include any number of immutable data blocks 212 and mutable data blocks 214, and the respective blocks may be arranged using any scheme. Generally, the immutable data blocks 212 may be discriminated from the mutable data blocks 214 based on, for example, an arrangement scheme for data blocks 210, identifiers of data blocks 210, and/or metadata that specifies the arrangement.

As discussed above, the data of mutable data blocks 214 may change over time. When the data of one or more mutable data blocks 214 is determined as having changed, a restore point may be generated and stored in restore point repository 136.

Turning to FIG. 2C, a diagram of an example of restoration point repository 136 in accordance with an embodiment is shown. As discussed above, restore point repository 136 may include information usable to revert (or implement) changes to mutable data stored in startup data storage.

In an embodiment, restoration point repository 136 includes any number of entries 230, 236. Each of entries 230, 236 may correspond to a respective restore point. Each of entries 230, 236 may include identifier 232 and restoration data 234.

Identifier 232 may include one or more data structures that include information regarding a restoration point. The information regarding the restoration point may be usable to ascertain how a restoration point may be used (e.g., to revert or implement changes). For example, identifier 232 may specify (i) versions of data in startup storage to which restoration data 234 may be applied, (ii) to which versions the data in startup storage will be updated to match by use of restoration data 234, (iii) identifiers of the versions, and/or (iv) other information to allow restoration data 234 to be used to revert and/or implement changes to mutable data in startup data storage.

Restoration data 234 may include one or more data structures that include information usable to modify mutable data stored in data storage to revert and/or implement a previous change to it. For example, restoration data 234 may specify changes to any number of data blocks such that, when the changes are implemented, the updated data blocks reflect the data post implementation of a change. In another example, restoration data 234 may specify the contents of changed data blocks and/or pre-change data blocks after implementation of a change. Thus, rather than implementing changes to data blocks, entire data blocks may simply be rewritten using the restoration data 234 to revert or implement a previous change to mutable data that has occurred.

As discussed above, the components of FIG. 1A may perform various methods to startup information handling systems. FIGS. 3-5B illustrates examples of methods that may be performed by the components of FIG. 1A. For example, a management controller of an information handling system may perform all or a portion of the methods. In the diagrams discussed below and shown in FIGS. 3-5B, any of the operations may be repeated, performed in different orders, and/or performed in parallel with or in a partially overlapping in time manner with other operations.

Figure 3:
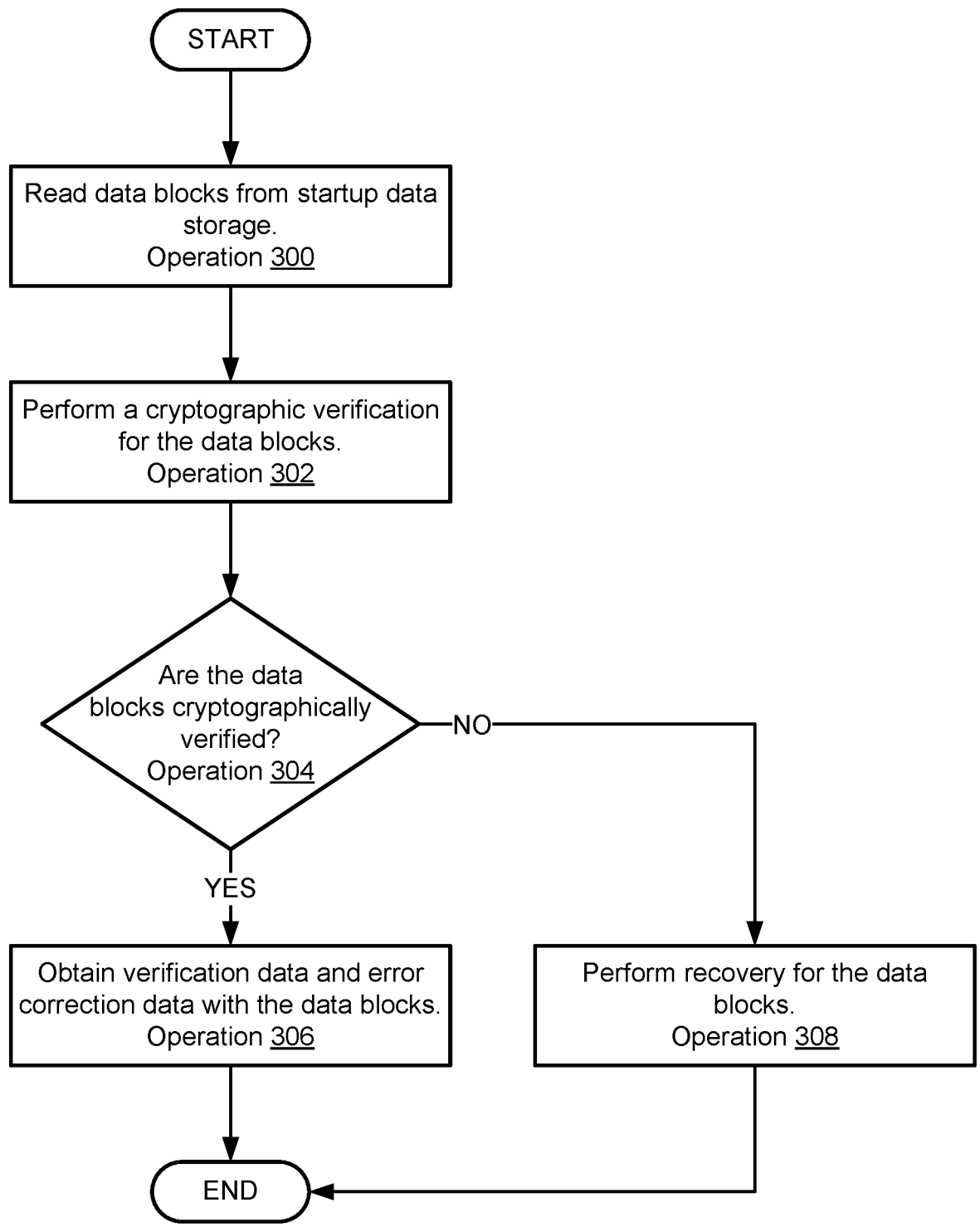
FIG. 3 shows a flow diagram illustrating a method of obtaining verification data and error correction data in accordance with an embodiment.

Turning to FIG. 3, a flow diagram illustrating a method of starting an information handling system in accordance with an embodiment is shown. The method illustrated in FIG. 3 may be performed when data in a startup data storage has not been cryptographically verified using cryptographic data in the data. For example, the method may be performed a first time an information handling system starts up, when data in a startup data storage is entirely rewritten, and/or in other scenarios where the data has never been cryptographically verified and/or when verification data and/or error correction data is not available.

At operation 300, data blocks from a startup data storage are read. The data blocks may include immutable data blocks and/or mutable data blocks. The data blocks may be read by issuing reads to the startup data storage for the data blocks. Prior to issuing the reads, the startup data storage may be operably connected to a management controller via a serial peripheral interface that may be muxed to the management controller or other components of the information handling system (e.g., a processor).

At operation 302, a cryptographic verification for the data blocks is performed. The cryptographic verification may be performed with cryptographic data from the data blocks. Generally, the cryptographic verification may be a computationally and/or time costly process. When the data blocks are cryptographically verified, it may be determined that the data blocks are trustable. For example, the cryptographic verification may indicate that the data blocks include computer code corresponding to a known trusted startup management entity.

At operation 304, it is determined whether the data blocks are cryptically verified. The cryptographic verification in operation 302 may indicate whether the data blocks are cryptographically verified. If the data blocks are cryptographically verified, then the method may proceed to operation 306. If the data blocks are not cryptographically verified, then the method may proceed to operation 308.

At operation 306, verification data and error correction data is obtained with the data blocks.

In an embodiment, the verification data is obtained by generating a hash tree for the data blocks. As discussed above, the hash tree may be usable to identify whether data blocks, subsequently read from the startup data storage, include one or more differences from the cryptographically verified data blocks.

In an embodiment, the verification data is obtained by generating first verification data for a portion of the data blocks that include immutable data and second verification data for another portion of the data blocks that include mutable data. As discussed above, the first and second verification data may be usable to verify immutable data and identify changes to mutable data, respectively.

In an embodiment, the error correction data is obtained by generating parity data or other types of data usable to correct corruptions of data blocks. The parity data may be usable to (i) identify corruptions of data blocks and (ii) correct the corruptions of the data blocks.

The method may end following operation 306.

Returning to operation 304, the method may proceed to operation 308 following operation 304 when it is determined that the data blocks are not cryptographically verified.

At operation 308, a recovery for the data blocks is performed. The recovery may include, for example, rewriting one or more of the data blocks. For example, all of the data blocks may be rewritten with data from a trusted source thereby allowing for a root of trust to be maintained.

The method may end following operation 308.

Figure 4A:
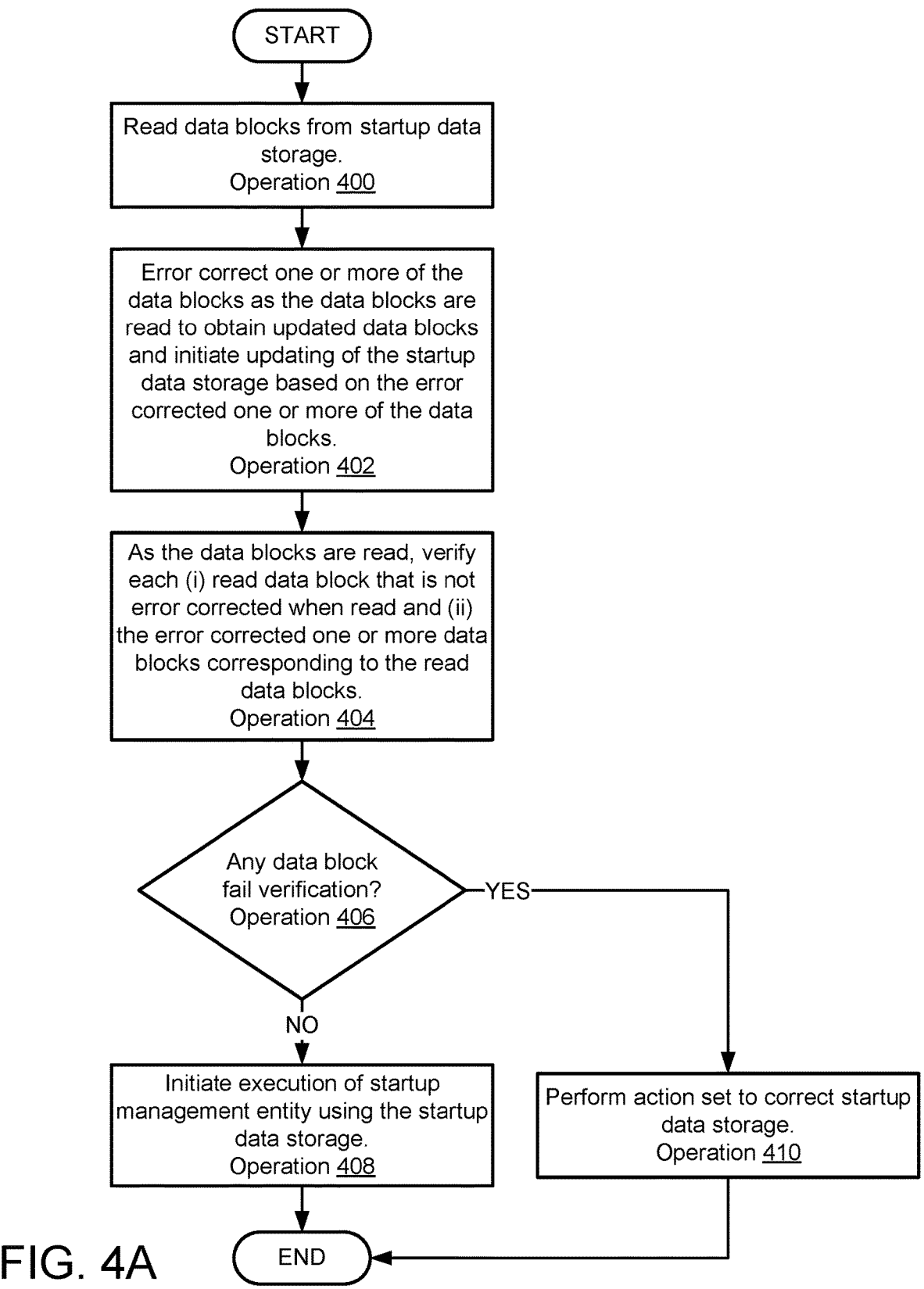
FIG. 4A shows a flow diagram illustrating a method of performing a startup of an information handling system in accordance with an embodiment.

Turning to FIG. 4A, a flow diagram illustrating a second method of starting an information handling system in accordance with an embodiment is shown. The method illustrated in FIG. 4A may be performed when data in a startup data storage has been cryptographically verified using cryptographic data in the data and verification data and/or error correction data is available. For example, the method may be performed during subsequent startups after a first time an information handling system starts up.

At operation 400, data blocks are read from startup data storage. The data blocks may be read as discussed with respect to operation 300, however, only data blocks that include immutable data may be read.

At operation 402, one or more of the data blocks are error corrected as the data blocks are read to obtain error corrected data blocks and initiate updating of the startup data storage based on the error corrected one or more of the data blocks.

In an embodiment, each data block that is read is subjected to error correction. For example, parity information or other types of error correction information may be used to (i) ascertain whether a read data block includes a corruption and (ii) correct the corruption in read data blocks that include corruptions. Each of the data blocks that is error corrected may be queued for writing to the startup data storage (e.g., overwriting the corresponding data block) as other data blocks are read from the startup data storage. Thus, corruptions in data blocks may be both identified and corrected prior to verification (e.g., a future or subsequent verification).

The updated data blocks may include (i) any read data blocks that are do not include corruptions and (ii) the error corrected data blocks. The updated data blocks may not include the data blocks that include the corruptions.

At operation 404, as the data blocks are read, the updated data blocks are verified. In other words, when a read data block is not subjected to error correction in operation 402, then the read data block may be subjected to verification. Likewise, when a read data block is corrected in operation 402, then the corrected data block (rather than the uncorrected data block) may be subjected to verification.

In an embodiment, the updated data blocks are verified by, for example, obtaining a hash of each of the updated data blocks (e.g., as each updated data block is subject to verification). The hash may then be compared to a corresponding portion of verification data to determine whether the corresponding updated data block has been verified. For example, if the obtained hash matches a hash included in the corresponding portion of the verification data, then the hashed updated data block may be treated as being verified. Otherwise, the hashed updated data block may be treated as being unverified.

At operation 406, it is determined whether any data block has failed verification. For example, as operations 400-404 are performed, data blocks may be read, error corrected, and verified. At any point in time as the operations are being performed with respect to a data block, the data block (or corresponding corrected data block) may fail verification.

If no data block fails verification, then the method may proceed to operation 408. If any data block fails verification, then the method may proceed to operation 410.

In operation 408, execution of a startup manage entity is executed using the startup data storage. For example, access to the startup data storage may be muxed to a processor, the processor may read data from the startup data storage into memory, and the processor may begin to perform the function of the startup data manager using the read data.

The method may end following operation 408.

Returning to operation 406, the method may proceed to operation 410 following operation 406 when it is determined that any data block failed verification.

In operation 410, an action set is performed to correct the startup data storage. The action set may include, for example, rewriting data of data blocks stored in the startup data storage. The rewritten data may be obtained from a trusted source. After the data is rewritten, the data in startup data storage may be treated as no longer being cryptographically verified. Consequently, the method illustrated in FIG. 3 may be performed once the action set is performed.

The method may end following operation 410.

Figure 4B:
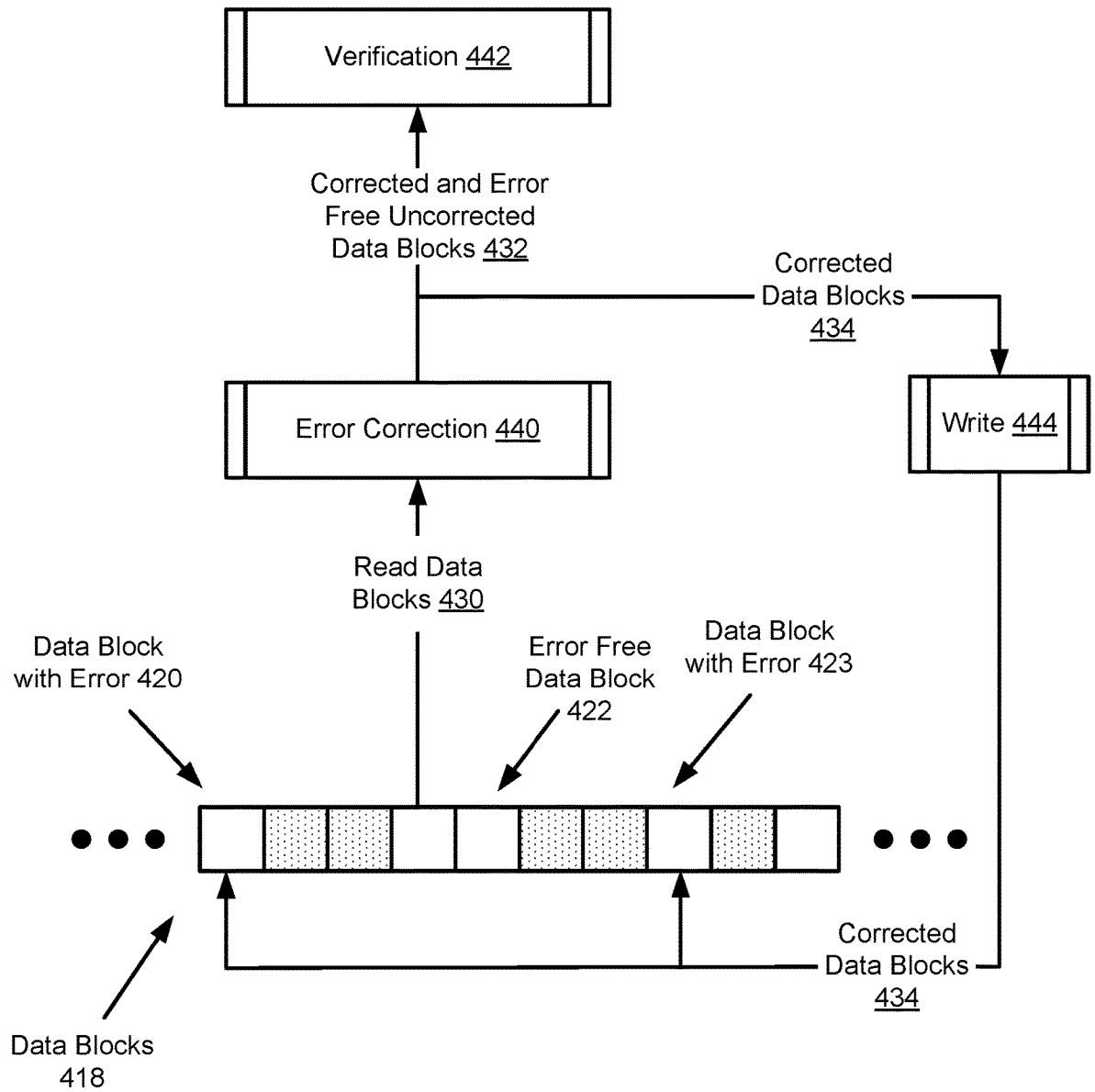
FIG. 4B shows a diagram illustrating an information handling system startup in accordance with an embodiment.

Turning to FIG. 4B, a diagram of performing a verification of immutable data in accordance with an embodiment is shown.

Data blocks 418 may include any number of data blocks (corresponding to immutable data). At least one of data blocks 418 may be a data block with an error 423 and at least one of data blocks 418 may be an error free data block 422. The at least one data block with an error 423 may be due, for example, to a corruption, which may be correctable (or not correctable depending on the type of error correction data available for error correction 440).

To ascertain whether data blocks 418 are to be trusted, read data blocks 430 from data blocks 418 may subjected to error correction 440. Error correction 440 may be performed with error correction data and may be capable of removing some types of corruptions if any of read data blocks 430 include those types of corruption. The types of corruption that may be detected and removed may depend on the type and quantity of error correction data available for use in error correction 440.

Error correction 440 may produce corrected and error free uncorrected data blocks 432 (which no longer include data blocks that include corruptions correctable with the error correction data). However, it should be appreciated that some corrected data blocks may not be free of corruption depending on the type and quantity of error correction data available for error correction 440.

Corrected and error free uncorrected data blocks 432 may be subjected to verification 442. For example, hashes (in accordance with a hash function used to generation verification data) of corrected and error free uncorrected data blocks 432 may be calculated and compared to corresponding portions of verification data to ascertain whether each data block of corrected and error free uncorrected data blocks 432 can be verified or is not verifiable (e.g., when the calculated hash differs from the hash in the corresponding portion of verification data).

While verification 442 is performed, corrected data blocks 434 (e.g., a portion of corrected and error free uncorrected data blocks 432) may be subjected to write 444. Write 444 may rewrite various data blocks 418 in startup data storage. For example, corrected data blocks 434 may be used to overwrite the data in corresponding data blocks of data blocks 418. In this manner, corruptions in data blocks 418 may be corrected (to the extent corruption is corrected in error correction 440) and the impact of such corruptions on verification 442 may be reduced (e.g., not all types of corruption may be correctable).

Figure 5A:
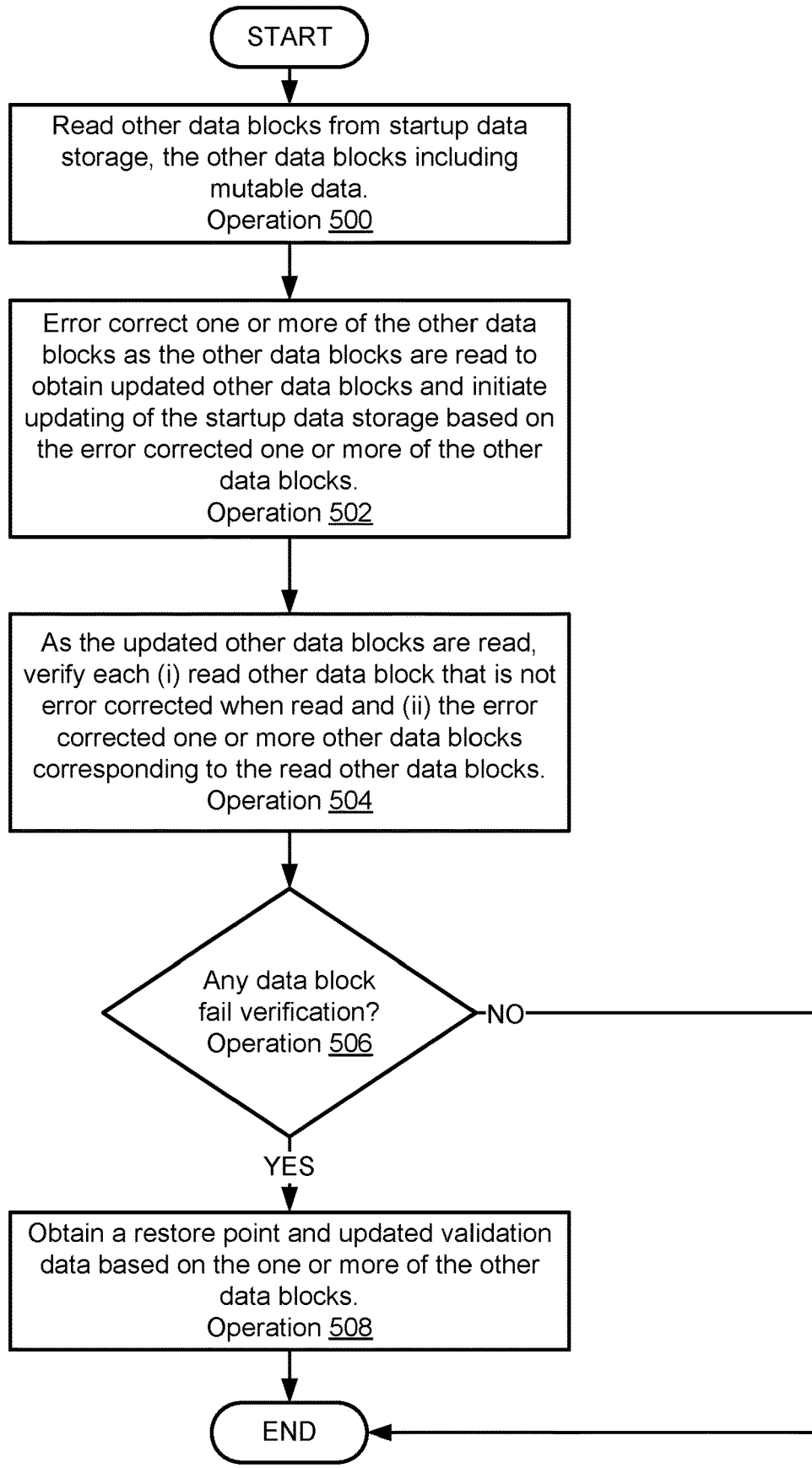
FIG. 5A shows a flow diagram illustrating a method of obtaining a restore point in accordance with an embodiment.

Turning to FIG. 5A, a flow diagram illustrating a method of generating restore points in accordance with an embodiment is shown. The method illustrated in FIG. 5A may be performed when data in a startup data storage has been cryptographically verified using cryptographic data in the data and verification data and/or error correction data is available. For example, the method may be performed during subsequent startups after a first time an information handling system starts up.

At operation 500, other data blocks are read from startup data storage. The other data blocks may be read as discussed with respect to operation 300, however, only data blocks that include mutable data may be read as the other data blocks.

At operation 502, one or more of the other data blocks are error corrected as the other data blocks are read to obtain updated other data blocks and to initiate updating of the startup data storage based on the error corrected one or more of the other data blocks. Operation 502 may be performed similarly to operation 402.

At operation 504, as the updated other data blocks are read, each of the updated other data blocks may be verified. In other words, when a read other data block is not subjected to error correction in operation 502, then the read other data block may be subjected to verification. Likewise, when a read other data block is corrected in operation 502, then the corrected other data block (rather than the uncorrected data block) may be subjected to verification.

In an embodiment, the updated other data blocks are verified by, for example, obtaining a hash of each of the updated other data blocks (e.g., as each updated data block is subject to verification). The hash may then be compared to a corresponding portion of verification data (e.g., second verification data, discussed above) to determine whether the corresponding updated other data block has been verified. For example, if the obtained hash matches a hash included in the corresponding portion of the verification data, then the hashed updated other data block may be treated as being verified. Otherwise, the hashed updated other data block may initially be treated as being unverified.

At operation 506, it is determined whether any of the updated other data blocks failed verification. If any of the updated other data blocks failed verification, then the method may proceed to operation 508. Otherwise the method may end following operation 506.

At operation 508, a restore point and updated validation is obtained based on the one or more of the other data blocks. In other words, rather than treating a verification failure as indicating that the other data blocks include untrusted data, the other data blocks may be treated as having been updated.

In an embodiment, the restore point is obtained by identifying changes to the one or more of the other data blocks. The changes may be used to generate a new entry in a restore point repository.

In an embodiment, the updated validation data is obtained by calculated hashes for the other data blocks that failed verification. The hashes may be used to update the validation data. For example, the obtained hashes may be used to rewrite data in nodes or other portions of the validation data corresponding to the one or more of the other data blocks that failed verification.

The method may end following operation 508.

Figure 5B:
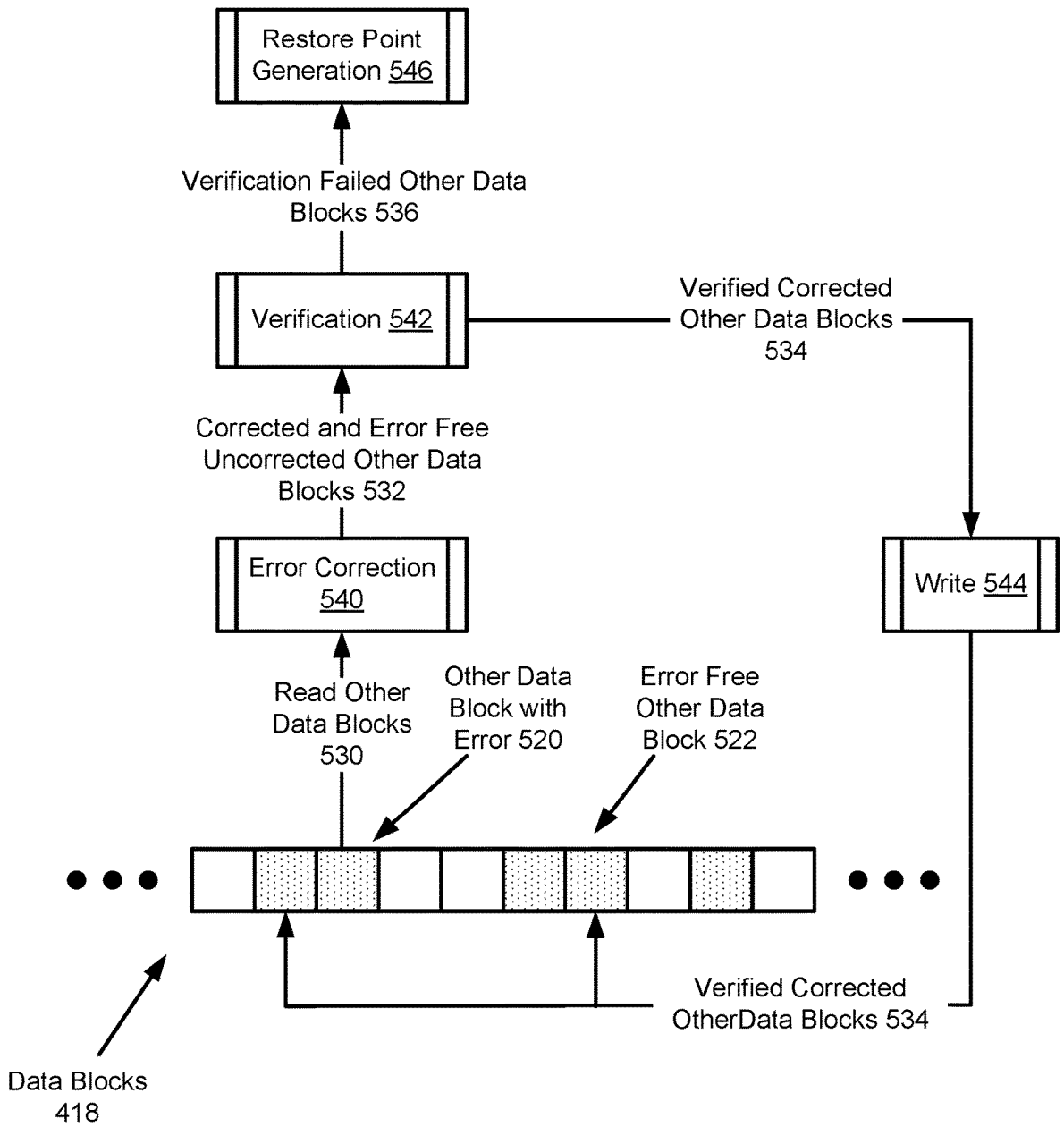
FIG. 5B shows a diagram illustrating an information handling system obtaining a restore point in accordance with an embodiment.

Turning to FIG. 5B, a diagram of performing a restore point generation in accordance with an embodiment is shown.

Data blocks 418 may include any number of other data blocks (e.g., that store mutable data). At least one of data blocks 418 may be a data block with an error 520 and at least one of data blocks 418 may be an error free data block 522. The at least one data block with an error 520 may be due, for example, to a corruption, which may be correctable (or not correctable depending on the type of error correction data available for error correction 540).

To ascertain whether the other data blocks of data blocks 418 have been changed, read other data blocks 530 from data blocks 418 may subjected to error correction 540. Error correction 540 may be performed with error correction data and may be capable of removing some types of corruptions if any of read other data blocks 530 include those types of corruption. The types of corruption that may be detected and removed may depend on the type and quantity of error correction data available for use in error correction 540.

Error correction 540 may produce corrected and error free uncorrected other data blocks 532 (which no longer include other data blocks that include corruptions correctable with the error correction data). However, it should be appreciated that some corrected other data blocks may not be free of corruption depending on the type and quantity of error correction data available for error correction 540.

Corrected and error free other data blocks 532 may be subjected to verification 542. For example, hashes (in accordance with a hash function used to generation verification data) of corrected and error free other data blocks 532 may be calculated and compared to corresponding portions of verification data to ascertain whether each data block of corrected and error free other data blocks 532 can be verified or is not verifiable (e.g., when the calculated hash differs from the hash in the corresponding portion of verification data).

While verification 542 is performed, verified corrected data blocks 534 may be subjected to write 544. Write 544 may rewrite various other data blocks of data blocks 418 in startup data storage. For example, verified corrected other data blocks 534 may be used to overwrite the data in corresponding other data blocks of data blocks 418. In this manner, corruptions in other data blocks of data blocks 418 may be corrected (to the extent corruption is corrected in error correction 540) and the impact of such corruptions on verification 542 may be reduced (e.g., not all types of corruption may be correctable).

In an embodiment, verified corrected data blocks 534 are only subjected to write 544 when other blocks including mutable data are also corrected. Consequently, in at least one embodiment, write 544 is not performed even when verified corrected other data blocks 534 are obtained. In this manner, recovery of mutable data may be tied to recovery of immutable data (e.g., by virtue of recovery of mutable data only being performed when recover of immutable data is performed).

In an embodiment, write 544 may be performed with data stored in a restore point rather than with verified corrected other data blocks 534. For example, presentation of verified corrected other data blocks 534 may be treated as an indication that some mutable data should be restored. The restoration may be performed with write 544 by modifying the data blocks based on a restore point (e.g., to a most recent or later restore point).

Additionally, while verification 542 is performed, verification failed other data blocks 536 may be subject to restore point generation 546. By virtue of failing verification, these other data blocks may be treated as having been modified and the changes may be used to generate corresponding restore points so that such changes may be able to be reverted or implemented in the future using the restore points.

In an embodiment, verification 542 is not performed. Rather, generation of corrected other data blocks 532 may serve as a trigger to generate a restore point.

Figure 6:
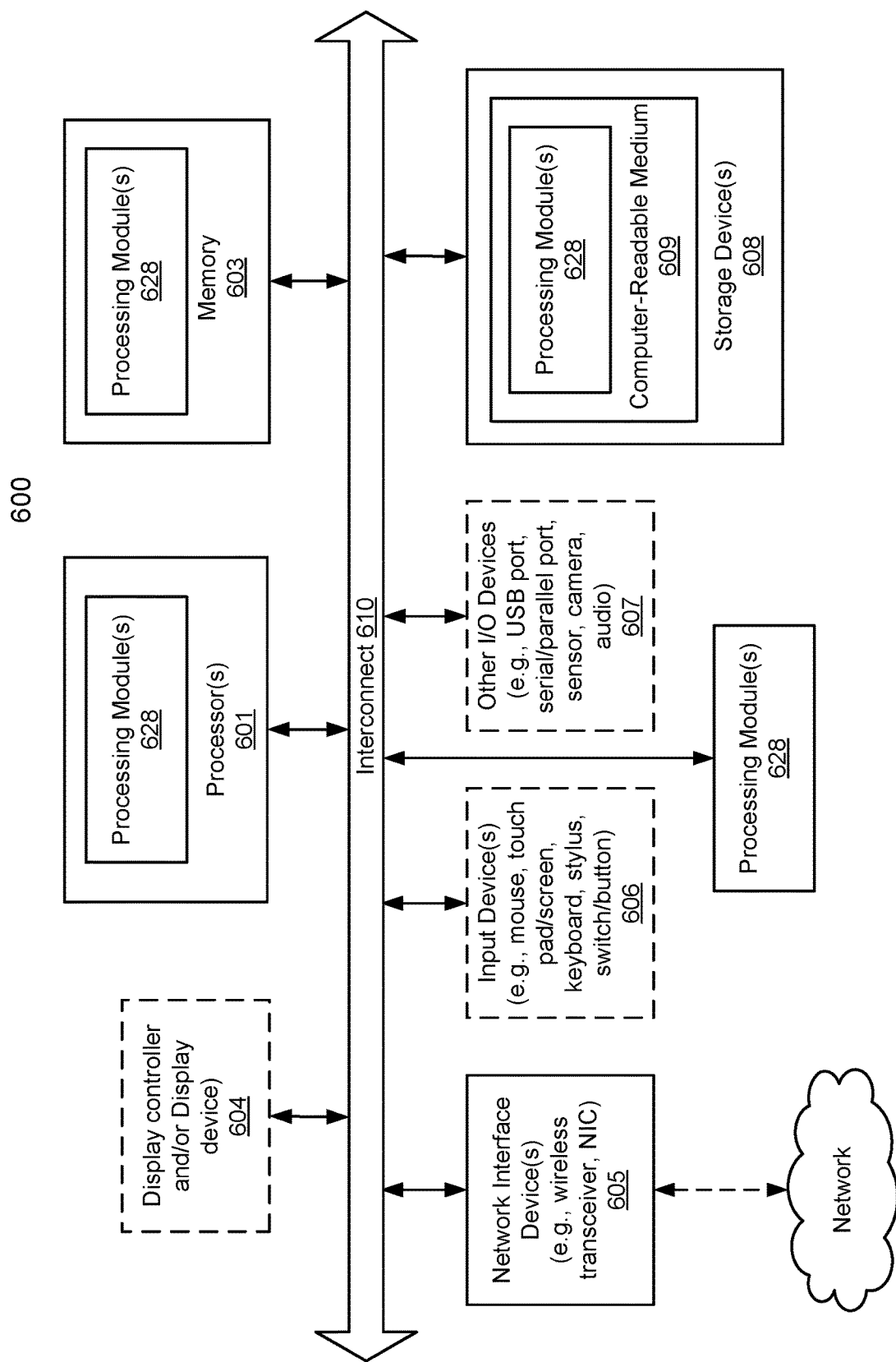
FIG. 6 shows a block diagram illustrating a computing device in accordance with an embodiment.

As discussed above, various components may be implemented with computing devices. For example, any of the components illustrated in FIGS. 1-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machineaccessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for starting operation of an information handling system, the method comprising:

reading, by a management controller of the information handling system, only immutable data blocks from a startup data storage, the immutable data blocks comprising an image of a startup management entity for the information handling system and at least one corruption;

for a first portion of the immutable data blocks that comprise the at least one corruption, correcting, by the management controller, each data block of the first portion using error correction data to obtain a portion of corrected immutable data blocks without correcting a second portion of the immutable data blocks that do not comprise the at least one corruption based on the error correction data;

updating, by the management controller, the immutable data blocks based on the portion of corrected immutable data blocks to obtain updated immutable data blocks stored in the startup data storage, the updated immutable data blocks comprising the image of the startup management entity and not the at least one corruption;

determining, by the management controller using the second portion of the immutable data blocks, the portion of corrected immutable data blocks, and verification data, whether the startup management entity is a trusted entity;

when the startup management entity is determined as being the trusted entity, initiating, by the management controller, execution of the startup management entity by the information handling system with the updated immutable data blocks in the startup data storage; and when the startup management entity is determined as not being the trusted entity, preventing, by the management controller, the execution of the startup management entity by the information handling system.

2. The computer-implemented method of claim 1, further comprising:
  reading, by the management controller, a version of the immutable data blocks from the startup data storage, the version of the immutable data blocks comprising the image of the startup management entity and not the at least one corruption;
  performing a cryptographic verification of the immutable data blocks to determine whether the startup management entity is the trusted entity;
  when the startup management entity is the trusted entity, generating, based on the version of the immutable data blocks, the verification data and the error correction data; and
  storing the verification data and the error correction data with the management controller.

3. The computer-implemented method of claim 1, further comprising:
  reading, by the management controller and after obtaining the portion of corrected immutable data blocks, only mutable data blocks from the startup data storage;
  identifying, by the management controller, a first portion of the mutable data blocks using second verification data, the verification data being associated with the immutable data blocks and the second verification data being associated with the mutable data blocks;
  generating, by the management controller, a restore point based on the first portion of the mutable data blocks;
  updating, by the management controller, the second verification data based on the first portion of the mutable data blocks; and
  storing the restore point with the management controller.

4. The computer-implemented method of claim 3, wherein the mutable data blocks are used during execution of the startup management entity.

5. The computer-implemented method of claim 3, further comprising:
  making a second determination, by the management controller, that an attempt to begin execution of the startup management entity failed;
  in response to the second determination, reverting the mutable data blocks in the startup data storage with the restore point to obtain reverted mutable data blocks in the startup data storage; and
  initiating, by the management controller, execution of the startup management entity by the information handling system with the updated immutable data blocks and the reverted mutable data blocks in the startup data storage.

6. The computer-implemented method of claim 1, wherein reading the immutable data blocks comprises:
  multiplexing data access to the startup data storage from a processor of the information handling system to the management controller,
  wherein initiating execution of the startup management entity comprises:
    multiplexing the data access to the startup data storage from the management controller to the processor, and
    initiating reading, by the processor, of the startup data storage with the data access to the startup data storage.

7. The computer-implemented method of claim 1, wherein determining whether the startup management entity is the trusted entity comprises:
  performing a hash check of each data block of the second portion of the immutable data blocks against corresponding portions of the verification data; and
  performing a hash check of each data block of the portion of corrected immutable data blocks against corresponding portions of the verification data.

8. The computer-implemented method of claim 1, wherein the determining whether the startup management entity is the trusted entity is completed without performing a cryptographic verification of the immutable data blocks with cryptographic data stored in the immutable data blocks.

9. The computer-implemented method of claim 1, wherein the management controller comprises a computing device that is hosted by the information handling system and operates independently from the information handling system.

10. A non-transitory machine-readable medium having instructions stored therein, which when executed by a processor, cause the processor to perform operations for starting operation of an information handling system, the operations comprising:
  reading, by a management controller of the information handling system, only immutable data blocks from a startup data storage, the immutable data blocks comprising an image of a startup management entity for the information handling system and at least one corruption;
  for a first portion of the immutable data blocks that comprise the at least one corruption, correcting, by the management controller, each data block of the first portion using error correction data to obtain a portion of corrected immutable data blocks without correcting a second portion of the immutable data blocks that do not comprise the at least one corruption based on the error correction data;
  updating, by the management controller, the immutable data blocks based on the portion of corrected immutable data blocks to obtain updated immutable data blocks stored in the startup data storage, the updated immutable data blocks comprising the image of the startup management entity and not the at least one corruption;
  determining, by the management controller using the second portion of the immutable data blocks, the portion of corrected immutable data blocks, and verification data, whether the startup management entity is a trusted entity;
  when the startup management entity is determined as being the trusted entity, initiate, by the management controller, execution of the startup management entity by the information handling system with the updated immutable data blocks in the startup data storage; and
  when the startup management entity is determined as not being the trusted entity, prevent, by the management controller, the execution of the startup management entity by the information handling system.

11. The non-transitory machine-readable medium of claim 10, wherein the operations further comprise:
  reading, by the management controller, a version of the immutable data blocks from the startup data storage, the version of the immutable data blocks comprising the image of the startup management entity and not the at least one corruption;
  performing a cryptographic verification of the immutable data blocks to determine whether the startup management entity is the trusted entity;
  when the startup management entity is the trusted entity, generating, based on the version of the immutable data blocks, the verification data and the error correction data; and storing the verification data and the error correction data with the management controller.

12. The non-transitory machine-readable medium of claim 11, wherein the operations further comprise:
reading, by the management controller and after obtaining the portion of corrected immutable data blocks, only mutable data blocks from the startup data storage;
identifying, by the management controller, a first portion of the mutable data blocks using second verification data, the verification data being associated with the data blocks and the second verification data being associated with the mutable data blocks;
generating, by the management controller, a restore point based on the first portion of the other data blocks; and
storing the restore point with the management controller.

13. The non-transitory machine-readable medium of claim 12, wherein the mutable data blocks are used during execution of the startup management entity.

14. The non-transitory machine-readable medium of claim 12, wherein the immutable data blocks comprise immutable data and the mutable data blocks comprise mutable data.

15. An information handling system, comprising:
a processor;
a startup data storage; and
a management controller adapted to perform operations for starting operation of the information handling system, the operations comprising:
reading only immutable data blocks from the startup data storage, the immutable data blocks comprising an image of a startup management entity for the information handling system and at least one corruption;
for a first portion of the immutable data blocks that comprise the at least one corruption, correcting each data block of the first portion using error correction data to obtain a portion of corrected immutable data blocks without correcting a second portion of the immutable data blocks that do not comprise the at least one corruption based on the error correction data;
updating the immutable data blocks based on the portion of corrected immutable data blocks to obtain updated immutable data blocks stored in the startup data storage, the updated immutable data blocks comprising the image of the startup management entity and not the at least one corruption;
determining, using the second portion of the immutable data blocks, the portion of corrected immutable data blocks, and verification data, whether the startup management entity is a trusted entity;
when the startup management entity is determined as being the trusted entity, initiating execution of the startup management entity by the processor with the updated immutable data blocks in the startup data storage; and
when the startup management entity is determined as not being the trusted entity, preventing the execution of the startup management entity by the processor.

16. The information handling system of claim 15, wherein the operations further comprising:
reading, by the management controller, a version of the immutable data blocks from the startup data storage, the version of the immutable data blocks comprising the image of the startup management entity and not the at least one corruption;
performing a cryptographic verification of the immutable data blocks to determine whether the startup management entity is the trusted entity;
when the startup management entity is the trusted entity, generating, based on the version of the immutable data blocks, the verification data and the error correction data; and
storing the verification data and the error correction data with the management controller.

17. The information handling system of claim 15, wherein the operations further comprise:
reading, after obtaining the portion of corrected immutable data blocks, only mutable data blocks from the startup data storage;
identifying a first portion of the mutable data blocks using second verification data, the verification data being associated with the immutable data blocks and the second verification data being associated with the mutable data blocks;
generating a restore point based on the first portion of the mutable data blocks; and
storing the restore point with the management controller.

18. The information handling system of claim 17, wherein the mutable data blocks are used during execution of the startup management entity.

* * * * *